United States Patent Office 3,321,526
Patented May 23, 1967

3,321,526
PRODUCTION OF HYDROXY BENZALDEHYDES
Pierre André Robert Marchand, Caluire, and Jean-Baptiste Grenet, Bron, France, assignors to Rhone-Poulenc S.A., Paris, France, a corporation of France
No Drawing. Filed Apr. 30, 1963, Ser. No. 276,996
7 Claims. (Cl. 260—600)

This invention relates to the production of hydroxybenzaldehydes.

Processes for the preparation of certain o-hydroxybenzaldehydes, especially salicylic aldehyde, from the corresponding o-hydroxybenzyl alcohol have already been proposed. In particular, the following processes are known:

(i) Trituration of o-hydroxybenzyl alcohol with platinum black in the presence of air [Piria, Liebigs Ann., 56, 42 (1845)];

(ii) Oxidation of the alcohol in aqueous solution with potassium chromate in the presence of sulphric acid (ibidem); and (iii) Oxidation of the alcohol in chloroform solution with active manganese dioxide (Dutch Patent No. 87,141).

The first two methods, for which no yield is given, are given in the scientific literature (Beilstein, vol. 8, p. 31) as methods of formation without any industrial interest.

The third method gives a relatively low yield and involves the use of considerable quantities of a reactant which, in order to be sufficiently active, must be prepared from costly products such as potassium permanganate.

It is also known to oxidise primary aromatic alcohols with air in the presence of platinum deposited on charcoal, or platinum dioxide [Heyns and Blazezewicz, Tetrahedron 9, 67 to 75 (1960)]. These authors show that the oxidation of primary aromatic alcohols with oxygen in the presence of a platinum catalyst gives an aldehyde when the operation is carried out in a purely organic medium, while in an aqueous medium the oxidation proceeds as far as the corresponding carboxylic acid. Thus, in the case of benzyl alcohol, oxidation in an n-heptane medium gives benzaldehyde, while in an aqueous medium and in the presence of a little sodium hydroxide, benzoic acid is obtained almost quantitatively.

It has now been found that hydroxybenzyl alcohols can be oxidized with oxygen in good yield to the corresponding hydroxybenzaldehydes if palladium is used as catalyst.

According, therefore, to the present invention as process for the production of ortho-, meta-, or para-hydroxybenzaldehydes comprises oxidizing the corresponding hydroxybenzyl alcohol in aqueous medium with oxygen in the presence of palladium as catalyst. It is preferred to oxidize hydroxybenzyl alcohols of the formula:

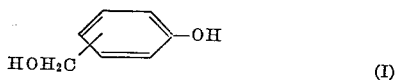

(I)

in which the —CH$_2$OH radical is in the ortho, meta or para position and the benzene nucleus may be substituted by halogen, alkyl, or alkoxy radicals, to the corresponding benzaldehydes.

Since palladium and platinum have generally been thought to have substantially identical catalytic activities [Methoden der Organischen Chemie, Houben-Weyl 4/2, pp. 165–193], it is surprising that the use of palladium instead of platinum not only results in a rapid and almost complete absorptive of oxygen, but also limits the oxidation to the aldehyde stage without any appreciable formation of the acid.

The alkyl and alkoxy groups in the compounds of Formula I may contain from 1 to 12 carbon atoms, and include, more especially, the methyl, ethyl, propyl, butyl, pentyl and hexyl groups. The halogen atoms may be more especially, chlorine, bromine or iodine atoms. o-Hydroxybenzyl alcohol and its nuclear substitution derivatives are preferred.

In the process of the invention the oxidation is carried out by passing oxygen or a gas containing oxygen, e.g., air, through an aqueous, preferably alkaline, solution of the hydroxybenzyl alcohol containing the catalyst in suspension. The operation is ordinarily carried out at atmospheric pressure, but it is also possible, where necessary, to operate under superatmospheric pressure, for example of the order of 1 to 10 kg./cm.$^2$ gauge. The progress of the reaction is checked by measuring the volume of oxygen absorbed. Generally speaking, the absorption of the oxygen stops, or at least slows down considerably, when the theoretical quantity corresponding to the formation of the aldehyde has been absorbed. It is also possible to follow the reaction by other known methods, such as by titration of the aldehyde formed. Instead of air, it is possible to employ any other mixture of oxygen with a gas which is inert under the conditions of the reaction.

The reaction temperature varies with the thermal stability of the product prepared, and may reach 100° C., or even more. A temperature of the order of 15–40° C. is generally very suitable.

The palladium employed as catalyst may be used in various forms such as, for example, palladium black, palladium oxide or metallic palladium, deposited on various supports such as carbon black, activated alumina, silica gel, asbestos, magnesium carbonate, calcium carbonate, or kieselguhr. Catalytic masses containing from 5% to 10% of palladium on a support are particularly suitable. The quantity of catalyst employed is small, of the order of 0.25% to 1% calculated on the weight of alcohol to be oxidized.

The concentration of the hydroxybenzyl alcohol in the aqueous solution must preferably be such that precipitation is avoided and a homogeneous solution is maintained throughout the reaction. A concentration of from 10% to 25% by weight is generally suitable. When it is desired to operate in alkaline medium, an alkaline agent such as sodium hydroxide or potassium hydroxide is added to the reaction medium. The proportion of alkaline agent should preferably be such that the molar ratio of alkaline agent to hydroxybenzyl alcohol is between 0.5 and 3, and especially about 1.5.

In a preferred embodiment of the process of the invention, the oxidation is carried out in the presence of boric acid or a borate in substantially equimolecular quantities in relation to the hydroxybenzyl alcohol to be oxidized, since this generally speeds up the oxidation without promoting the formation of secondary products.

In practice, oxygen or air is passed through a dilute aqueous solution of the hydroxybenzyl alcohol containing the palladium catalyst and, where appropriate, an alkaline agent and boric acid in the above-indicated proportions, until the calculated amount of oxygen is absorbed, i.e., for one to several hours depending upon the starting material employed. The catalyst is then separated from the reaction mass which, where an alkaline agent has been used, is then acidified to pH ⩽6 by the addition of a dilute mineral acid. The desired aldehyde is then isolated, for example by steam distillation, and purified by known methods, such as extraction with a solvent and recrystallisation.

The hydroxybenzyl alcohol starting material may be prepared by any method described in the chemical literature, for example condensation of phenol, m-cresol, or m-ethylphenol with formaldehyde in an aqueous medium in the presence of zinc acetate or cadmium formate (British patent specification No. 774,696). When the group —CH$_2$OH is in the ortho-position to the hydroxyl group the following process is preferably employed. In this process formaldehyde or a formaldehyde-generating compound, e.g., trioxane, is reacted with an aryl metaborate of the general formula:

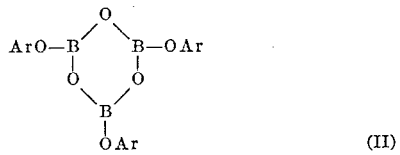

in which Ar- represents a phenyl radical in which at least one of the ortho positions is free.

The metaborates of Formula II may be prepared by reaction of a phenol of the general formula:

in which Ar- is as hereinbefore defined, with boric acid or boric anhydride, in the proportion of one molecule of phenol of Formula III to one molecule of boric acid or a half-molecule of boric anhydride. As the phenol, the cresols, 2,3-(or 2,4-, or 2,5-, or 3,4-)xylenol, the monoethylphenols, the monopropylphenols, the monobutylphenols, the monomethyl, monoethyl, monopropyl and monobutyl ethers of pyrocatechol, of resorcinol and of hydroquinone, the monochlorophenols, 2,3-(or 2,4-, or 2,5-, or 3,4-, or 3,5-)dichlorophenol, 2,4,5-trimethylphenol, 2,3,5-trichlorophenol, 2,3-dimethoxyphenol, or 3,5-dimethoxyphenol may be used. The reaction is carried out in the presence of a water-entrainment agent such as benzene, toluene or xylene, the water being distilled as it is formed.

When these metaborates are reacted with gaseous formaldehyde, the operation may be carried out at room temperature, i.e., at about 20–30° C., but it is also possible to operate at a higher temperature. If a polymer of formaldehyde is employed, it is always necessary, on the other hand, to heat in order to depolymerise the polymer and liberate the formaldehyde, because the latter only reacts in monomeric form. Since the reaction is exothermic, it is preferable, when operating with polymeric formaldehyde, to add this polymeric formaldehyde in small portions.

The condensation reaction must be carried out in anhydrous medium. The solvent which has been employed in the preparation of the metaborate may be used also for the condensation. Under these conditions, it is unnecessary to isolate the metaborate after esterification and the formaldehyde may be directly added to this medium. The compound thus obtained is thereafter treated with an aqueous alkali metal hydroxide solution, and an aqueous solution is then obtained containing, in the form of their alkali-metal salts, an ortho-hydroxybenzyl alcohol corresponding to the phenol of Formula III employed and boric acid. The desired ortho-hydroxybenzyl alcohol may be liberated from this solution by addition of a strong mineral acid, such as sulphuric acid, followed by extraction. However, the aqueous alkaline solution may be directly oxidized in accordance with the process of the invention.

It is thus possible to prepare compounds such as salicylic aldehyde directly from the corresponding phenol, without isolation of any intermediate products.

The following examples illustrate the invention.

Example 1

(a) Into a 500 cc. flask, having an external jacket for the circulation of water at constant temperature and mounted on a shaking table, are introduced 1.24 g. of carbon black containing 10% of palladium, and then 200 cc. of an N potassium hydroxide solution, in which there have been dissolved 12.4 g. of o-hydroxybenzyl alcohol and 6.2 g. of crystalline boric acid, are added. The flask is connected to an oxygen gasometer and, when the air has been removed, the apparatus is adjusted to produce a continuous oxygen pressure substantially equal to atmospheric pressure. The reaction mass is stirred at a temperature of about 25° C. until oxygen absorption ceases, which takes about 11 hours.

The operation is then stopped and the product centrifuged to separate the catalyst. The filtrate, which contains salicylic aldehyde in the form of its sodium salt and sodium borate, is acidified to pH 1 by the addition of 50% dilute aqueous sulphuric acid. The liberated aldehyde is steam-distilled and separated from the water by decantation, and the aqueous layer is then extracted with diethyl ether. The ethereal extract is combined with the decanted organic layer. After drying over anhydrous sodium sulphate, followed by evaporation of the solvent in vacuo, there are obtained 10.25 g. of a product containing 98.1% of salicylic aldehyde, which corresponds to a yield of 83.5% calculated on the alcohol introduced.

(b) By repeating the same experiment, but in the absence of boric acid, a substantially equivalent yield of salicylic aldehyde is obtained, but the reaction lasts 45 hours.

(c) By replacing the oxygen by air, a 74% aldehyde yield is obtained under the same conditions as given under (a).

(d) When the experiment as described under (a) is repeated, but the palladium catalyst is replaced by 2.4 g. of platinum black containing 5% of platinum, the oxygen absorption stops at the end of 8 hours, which corresponds to only 43.5% of the theoretical quantity of oxygen required to convert the o-hydroxybenzyl alcohol into salicylic aldehyde. After separation of the products as described above, there are obtained 1.03 g. of salicylic aldehyde, i.e., a yield of 12.5% calculated on the alcohol treated.

Examples 2 to 6

The following results are obtained by oxidizing other hydroxybenzyl alcohols under the conditions described in Example 1(a):

| Example | Starting material | Weight, g. | Product obtained | Weight, g. | Yield calculated on the alcohol introduced, percent |
|---|---|---|---|---|---|
| 2 | 2-hydroxymethyl-4-methylphenol | 13.6 | 2-hydroxy-5-methylbenzaldehyde (m.p.=54° C.) | 11.2 | 83.55 |
| 3 | 2-hydroxymethyl-6-methylphenol | 13.6 | 2-hydroxy-3-methylbenzaldehyde (solidification point 12° C.). | 12.8 | 96.5 |
| 4 | 2-hydroxymethyl-6-ethoxyphenol | 16.8 | 2-hydroxy-3-ethoyzbenzaldehyde (m.p.=65° C.) | 14.1 | 85 |
| 5 | 2-hydroxymethyl-6-chlorophenol | 15.8 | 2-hydroxy-3-chlorobenzaldehyde (m.p.=54° C.) | 12.9 | 83 |
| 6 | 2-methoxy-4-hydroxymethylphenol (vanillic alcohol). | 15.4 | 3-methoxy-4-hydroxybenzaldehyde (or vanillin) | 9.5 | 62 |

Example 7

Into a three-necked, three-litre spherical flask provided with a stirrer, a thermometer tube and a reflux column comprising separating means and a return duct, are introduced 376 g. of phenol (4 moles), 248 g. of crystalline boric acid (4 moles), and 50 cc. of toluene. Distillation is carried out for 3 hours with return of the entrainment agent until the theortical quantity of water has been separated. The product is then diluted with 500 cc. of toluene, a suspension of 120 g. of trihydroxymethylene in 500 cc. of toluene is added and the temperature is maintained at 90°–92° C. until the reaction of the formaldehyde has ended (i.e., in about 30 minutes).

The toluene solution of saligenol metaborate obtained is hydrolysed at a temperature of 15° C. with a sodium hydroxide solution prepared by adding 650 cc. of water to 1000 cc. of sodium hydroxide (36° Bé.), whereafter the product is decanted and the aqueous solution containing the sodium salts of saligenol and boric acid is separated.

This aqueous solution is then directly subjected to oxidation by the procedure of Example 1(a), except that it is unnecessary to add further boric acid. Oxygen under atmospheric pressure is passed through the aqueous solution, to which have been added 50 g. of palladium black containing 10% of palladium, until the volume of oxygen absorbed corresponds to the quantity theoretically necessary to convert the saligenol into salicylic aldehyde. This takes about 6 hours. The catalyst is then separated from the reaction mass, the latter is acidified by the addition of 580 cc. of 9 N sulphuric acid, and steam distillation and extraction with ether are then performed as described in Example 1(a). 313 g. of salicylic aldehyde, which represents a yield of 63% calculated on the phenol employed, are thus obtained.

We claim:

1. Process for the production of a hydroxybenzaldehyde selected from the class consisting of ortho-, meta-, and para-hydroxybenzaldehydes, which comprises subjecting a hydroxybenzyl alcohol selected from the class consisting of ortho-, meta-, and para-hydroxybenzyl alcohols dissolved in an aqueous medium and at a temperature below the decomposition temperature of the said hydroxybenzyl alcohol to the action of elemental oxygen in the presence of a palladium catalyst until substantially the theoretical uptake of oxygen has occurred, and isolating the desired hydroxybenzaldehyde.

2. Process for the production of a hydroxybenzaldehyde of the formula:

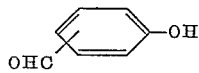

in which the CHO radical is in a position relative to the hydroxyl group selected from ortho, meta and para, and the benzene nucleus may be further substituted by substituents selected from the class consisting of halogen, alkyl of up to 12 carbon atoms, and alkoxy of up to 12 carbon atoms, which comprises subjecting a hydroxybenzyl alcohol of the formula:

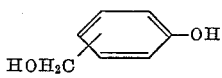

in which the —CH$_2$OH radical is in a position relative to the hydroxyl group selected from ortho, meta and para, and the benzene nucleus may be further substituted by substituents selected from the class consisting of halogen, alkyl of up to 12 carbon atoms, and alkoxy of up to 12 carbon atoms, dissolved in an aqueous medium and at a temperature below the decomposition temperature of the said hydroxybenzyl alcohol to the action of elemental oxygen in the presence of a palladium catalyst until substantially the theoretical uptake of oxygen has occurred, and isolating the desired hydroxybenzaldehyde.

3. Process for the production of salicylic aldehyde, which comprises subjecting o-hydroxybenzyl alcohol dissolved in an aqueous medium and at a temperature below the decomposition temperature of o-hydroxybenzyl alcohol to the action of elemental oxygen in the presence of a palladium catalyst until substantially the theoretical uptake of oxygen has occurred, and isolating the desired salicylic aldehyde.

4. Process according to claim 1 in which the aqueous medium is rendered alkaline by the presence of 0.5 to 3 moles of an alkaline agent selected from sodium and potassium hydroxides per mole of hydroxybenzyl alcohol.

5. Process according to claim 1 in which the aqueous medium also comprises boric acid in substantially equimolecular amount in relation to the hydroxybenzyl alcohol.

6. Process according to claim 2 in which the aqueous medium is rendered alkaline by the presence of 0.5 to 3 moles of an alkaline agent selected from sodium and potassium hydroxides per mole of hydroxybenzyl alcohol and contains boric acid in substantially equimolecular amount in relation to the hydroxybenzyl alcohol.

7. Process for the production of salicylic aldehyde which comprises subjecting o-hydroxybenzyl alcohol dissolved, in an aqueous medium containing about 1.5 moles of an alkaline agent selected from sodium and potassium hydroxides, and about one mole of boric acid per mole of o-hydroxybenzyl alcohol at a temperature below the decomposition temperature of o-hydroxybenzyl alcohol, to the action of oxygen in the presence of a palladium catalyst until substantially the theoretical uptake of oxygen has occurred, and isolating salicylic aldehyde from the reaction product.

References Cited by the Examiner

UNITED STATES PATENTS

| | | | |
|---|---|---|---|
| 1,801,416 | 4/1931 | Ehrlich | 260—600 |
| 2,676,189 | 4/1954 | Britton et al. | 260—600 |
| 3,071,620 | 1/1963 | Muller et al. | 260—600 |
| 3,080,426 | 3/1963 | Kirshenbaum et al. | 260—603 |

LEON ZITVER, *Primary Examiner.*

J. J. SETELIK, R. LILES, *Assistant Examiners.*